United States Patent
Johnson et al.

(10) Patent No.: US 6,304,254 B1
(45) Date of Patent: Oct. 16, 2001

(54) DISPLAY DEVICE

(75) Inventors: Mark T. Johnson, Eindhoven (NL); David W. Parker, Redhill (GB)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/119,890

(22) Filed: Jul. 21, 1998

(30) Foreign Application Priority Data

Jul. 22, 1997 (EP) .................................................. 97202270

(51) Int. Cl.$^7$ ...................................................... G09G 3/36
(52) U.S. Cl. .............................. 345/204; 345/63; 345/84; 345/87; 345/90; 345/95; 345/601; 348/797; 349/141
(58) Field of Search .................................. 345/58, 60, 63, 345/84, 87, 90, 95, 101, 204, 601; 348/797; 349/141

(56) References Cited

U.S. PATENT DOCUMENTS

| | | | |
|---|---|---|---|
| 4,443,741 | * 4/1984 | Tanaka et al. | 315/307 |
| 4,621,260 | * 11/1986 | Suzuki et al. | 345/92 |
| 4,626,072 | * 12/1986 | Clerc et al. | 349/34 |
| 4,803,480 | * 2/1989 | Soneda et al. | 345/100 |
| 5,151,690 | * 9/1992 | Yamazaki | 345/96 |
| 5,173,687 | * 12/1992 | Tanaka et al. | 345/94 |
| 5,252,957 | * 10/1993 | Itakura | 345/98 |
| 5,307,084 | * 4/1994 | Yamaguchi et al. | 345/58 |
| 5,369,512 | * 11/1994 | Yanai et al. | 349/38 |
| 5,416,495 | * 5/1995 | Davis et al. | 345/87 |
| 5,495,265 | 2/1996 | Hartman et al. | 345/87 |
| 6,002,382 | * 12/1999 | Hayashi et al. | 345/60 |
| 6,040,886 | * 3/2000 | Ota et al. | 349/141 |
| 6,040,887 | * 3/2000 | Matsuyama et al. | 349/141 |
| 6,043,797 | * 3/2000 | Clifton et al. | 345/1 |

FOREIGN PATENT DOCUMENTS

0667555A1   8/1995   (EP) .............................. G02F/1/1343

* cited by examiner

Primary Examiner—Bipin Shalwala
Assistant Examiner—Vincent E. Kovalick

(57) ABSTRACT

LC display device based on "plane switching", in which the switching speed is increased by overdriving the pixels upon a change of the voltage across these pixels while taking, for example, the hydrodynamical properties of the LC material into account. The correction means may also correct for changes of ambient or liquid temperature.

20 Claims, 5 Drawing Sheets

DISPLAY DEVICE

BACKGROUND OF THE INVENTION

The invention relates to a display device comprising two substrates, at least one of which is transparent, with liquid crystal material between the substrates, orientation means orienting the molecules of the liquid crystal material substantially parallel to the substrates, electrodes on at least one of the substrates, polarization means, selection means for selecting at least one pixel, an electric field being applied substantially parallel to said substrates in the operating state during selection, and drive means for supplying a signal voltage to an electrode coupled to the pixel.

Display devices of this type are used in flat-panel display devices such as television, monitors, alphanumerical displays etc.

A display device of the above-mentioned type is described in EP-A-0 667 555. This device is based on the "in plane switching effect" and switches between different electro-optical states with the aid of the electric field directed substantially parallel to the substrates and is therefore referred to as "horizontal electrical field type display". However, this effect is much slower than the generally used (twisted nematic) TN effect so that it is not usable or hardly usable in applications where a high speed is required (video, monitors).

EP-A-0 667 555 describes how the switching speed can be increased, but the optimally realized switching times were between 25 msec and 30 msec, while a full transition within one field time, which is typically 16.7 msec at a signal frequency of 60 Hz, is desired for video applications.

OBJECTS AND SUMMARY OF THE INVENTION

It is, inter alia, an object of the present invention to provide a display device of the type described above, which switches considerably more rapidly. It is another object of the invention to provide such a display device which can be driven at video speed, possibly up to 100 Hz or more.

To this end, a display device according to the invention is characterized in that the drive means are provided with correction means which, during selection of a pixel, adapt the signal voltage to be supplied to the electrode coupled to the pixel, dependent on an external data voltage supplied during the selection and on the external data voltage supplied during the previous selection of the same pixel.

It appears that the switching speed of a pixel in a configuration as mentioned above (IPS or "in plane switching") is enhanced by extending the range of the signal voltages to be supplied to the electrode coupled to the pixel to a considerable extent with respect to the range of external data voltages used for display purposes. In other electro-optical effects (for example, the guest-host effect or bistable effects such as SSFLC), this measure does not have any accelerating effect at all.

The correction means preferably adapt the signal voltage to be supplied to the electrode coupled to the pixel in such a way that the pixel reaches the transmission or reflection value of the pixel associated with the external data voltage before the next selection of the same pixel.

A correction in advance of externally supplied signals, based on signal values during the previous selection for a twisted nematic liquid crystal display device, is known per se from U.S. Pat. No. 5,495,265. However, this document deals with the correction of the charge across a pixel due to the capacitance change of this pixel upon a change of the voltage. Upon a transition between two extreme states, the dielectric constant changes from $\epsilon\|$ to $\epsilon\bot$, or conversely. At an increasing field, the dielectric constant having the highest value will gain more influence. In the configuration which is used in IPS, the dielectric constant of the substrate material (for example, glass) has a much greater influence than that of the liquid crystal material. Due to the specific structure, an at least equally large part of the electrical field lines extends through the substrates. The dielectric constant of the substrates does not change during switching. Due to the small rotation of the liquid crystal molecules, the dielectric constant of the liquid crystal material is also changed to a very small extent. The total capacitance between the electrodes of a pixel is thus substantially constant upon a change of the transmission state, so that the capacitance of the pixels in a display device based on the "in plane switching effect" does not change or hardly changes with the drive voltage (or the voltage across the pixel). The correction shown in U.S. Pat. No. 5,495,265 thus has hardly any influence in such a display device. In a display device which is based on the "in plane switching effect", the duration of the selection and the hydrodynamical properties of the liquid crystal material define the extent of the correction to a large degree. This correction can be defined empirically (or approximated by means of a simple formula) and can be subsequently stored for one type of display device in, for example, a look-up table; alternatively, a microprocessor can be used for computing the correction.

If necessary, a change of the temperature of the liquid crystal or the ambient temperature can be included in the correction.

The invention is applicable to active matrices in which selection takes place by means of active switches such as three-pole switches (thin-film transistors) or two-pole switches, but also to Plasma Addressed Liquid Crystal displays (PALC), in which the selection takes place via plasma ducts.

These and other aspects of the invention are apparent from and will be elucidated with reference to the embodiments described hereinafter.

BRIEF DESCRIPTION OF THE DRAWINGS

In the drawings:

FIG. 7 shows a possible implementation of the correction means according to the invention, while

DESCRIPTION OF THE PREFERRED EMBODIMENTS

Figure 1:
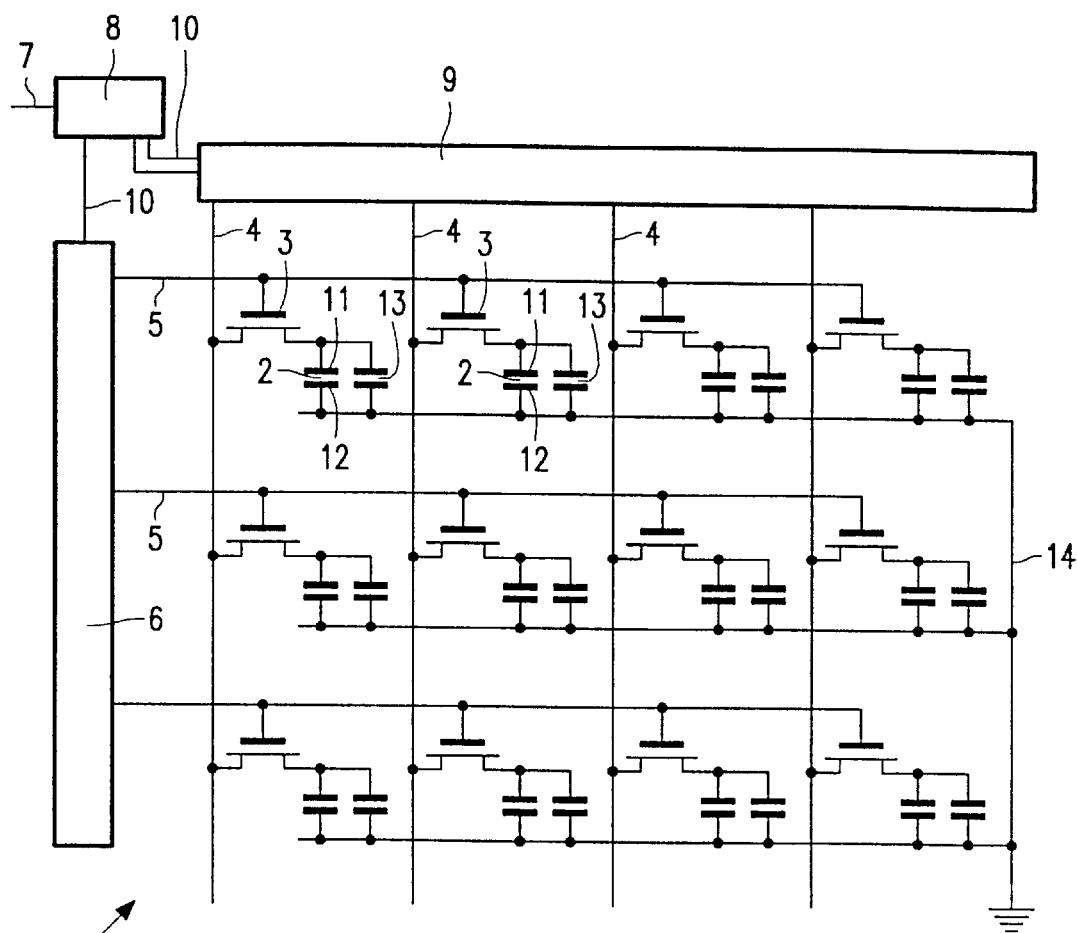
FIG. 1 shows diagrammatically a part of a display device according to the invention.

The Figures are diagrammatic and not to scale; corresponding elements are generally denoted by the same reference numerals.

FIG. 1 shows diagrammatically an equivalent circuit diagram of a part of a picture display device 1. This device comprises a matrix of pixels 2 arranged in rows and columns. The pixels 2 are connected to column or data electrodes 4 via switches, in this example TFT transistors 3. A row of pixels is selected via row or selection electrodes 5 which select the relevant row via the gate electrodes of the TFTs. The row electrodes 5 are consecutively selected by means of a row-drive circuit 6, for example a shift register.

Incoming data signals, for example (video) information 7, are processed and, if necessary, corrected in a processing/drive unit 8 and stored in a data register 9. The voltages supplied by the data register 9 cover a voltage range which is sufficient to set the desired scale of grey levels. Pixels 2, here represented by means of capacitors, are positively or negatively charged via the TFTs 3 because the electrodes 11 take over the voltage from the column electrodes during selection. In this example, the electrodes 12 are connected to, for example ground via a common connection 14. Mutual synchronization takes place via drive lines 10.

Figure 2:
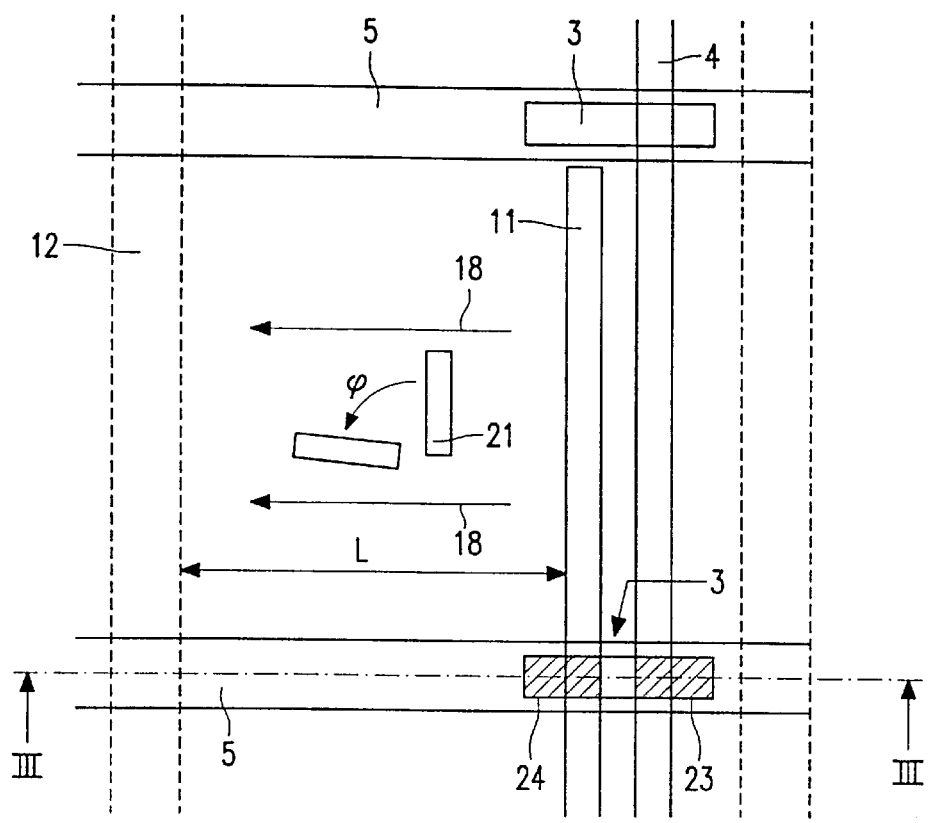
FIG. 2 is a plan view of a pixel operating in accordance with the principle ("in plane switching" or IPS) described above.
Figure 3:
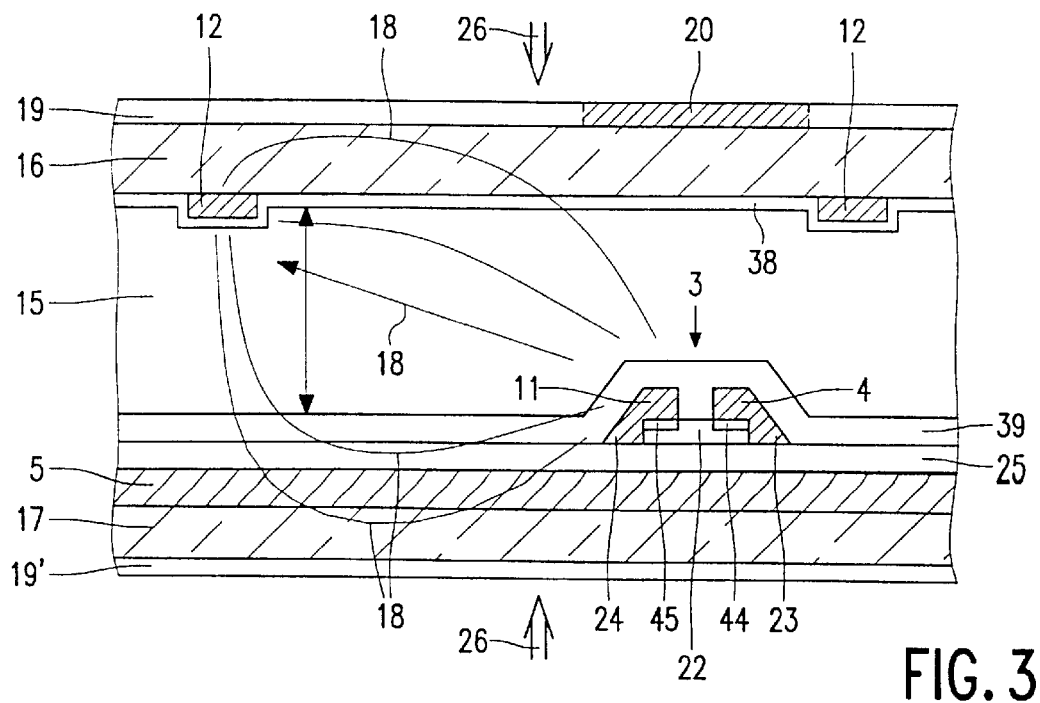
FIG. 3 is a cross-section taken on the line III—III in FIG. 2.
Figure 3A:
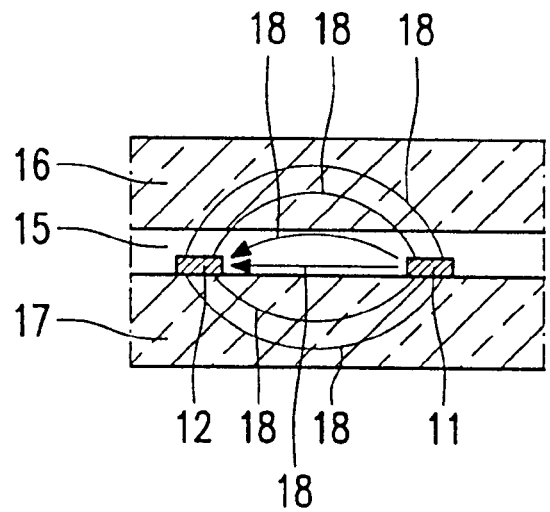

FIG. 2 is a diagrammatic plan view and FIG. 3 is a diagrammatic cross-section of a part of a liquid crystal display device comprising a liquid crystal pixel 2 with a nematic liquid crystal material 2 present between two substrates 16, 17 of, for example glass and provided with electrodes 11, 12, respectively. The device further comprises orientation layers 38, 39 which orient the liquid crystal material on the inner walls of the substrates, in this example into the direction of the electrodes 11, 12. In this case, the liquid crystal material has a positive optical anisotropy and a positive dielectric anisotropy. If the electrodes 11, 12 are energized by means of an electric voltage, the molecules 21 thus direct themselves to the field.

To this end, the electrode 11 is provided with a data voltage via a thin-film transistor (TFT) 3 which is connected to a data electrode 4. As soon as this transistor of, for example amorphous silicon, is selected via the selection electrode 5, the TFT becomes conducting. The voltage of the data electrode 4 is then transferred to the electrode 11. To this end, a (continuous) layer of insulating material 25 functioning as a gate insulator is present between the selection electrode 5 and the amorphous silicon 22. Furthermore, the TFT comprises a source zone 44 and a drain zone 45 which are connected in an electrically conducting manner to the electrodes 4, 11 via contact metallizations 23, 24. In this example, the electrode 12 is connected to ground. To prevent degradation of the liquid crystal material, the data voltage is alternately supplied positively and negatively. To prevent leakage current in the TFT due to incident light 26, the substrate 16 is also provided with a black mask 20.

Since the liquid crystal layer 15 has a thickness t which is much smaller than the distance L between two adjacent electrodes 11, 12 (d is, for example 0.38L), the molecules 21 rotate due to the applied electric field (denoted by arrows 18) in a plane which is substantially parallel to the two substrates. As described in the opening paragraph, the electric field extends as far as the substrates 16, 17 so that the dielectric constant of the substrates largely determines the capacitance between the electrodes 11, 12. For the sake of clarity, this is shown once more in another embodiment (FIG. 3) in which both electrodes 11, 12 are present on the same substrate 17.

This rotation introduces birefringence which changes, in generally known manner, the transmission of (incident) light 26 of a backlight. The device further comprises two polarizers 19 whose direction of polarization is, for example, mutually parallel. Modification of the mutual orientation of the polarizers optimizes the contrast of the display device.

Figure 4:
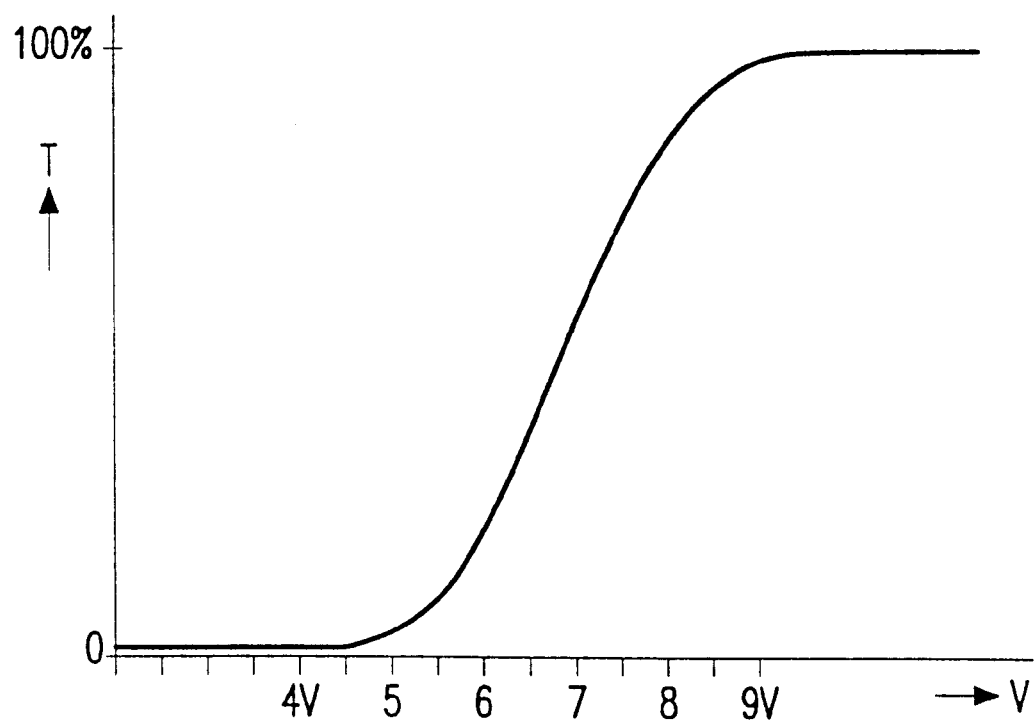
FIG. 4 shows a transmission/voltage characteristic associated with the pixel.

The associated transmission/voltage characteristic curve is shown in FIG. 4. At a voltage of a 6 volts across the display cell, approximately 30% of the maximum quantity of light is transmitted in this example (30% transmission), while at a voltage of 7 volts across the display cell, approximately 60% of the maximum quantity of light is transmitted (60% transmission). The dynamic behavior of the display cell is described with reference to FIGS. 5, 6. In a display device comprising a plurality of rows, each row is selected during a line selection time $t_1$ during each field time $t_f$ which is, for example, 16.7 msec. In video applications, information of an odd line is supplied during a first field, while information of the subsequent even line is supplied on the same row in the next field.

Figure 5:
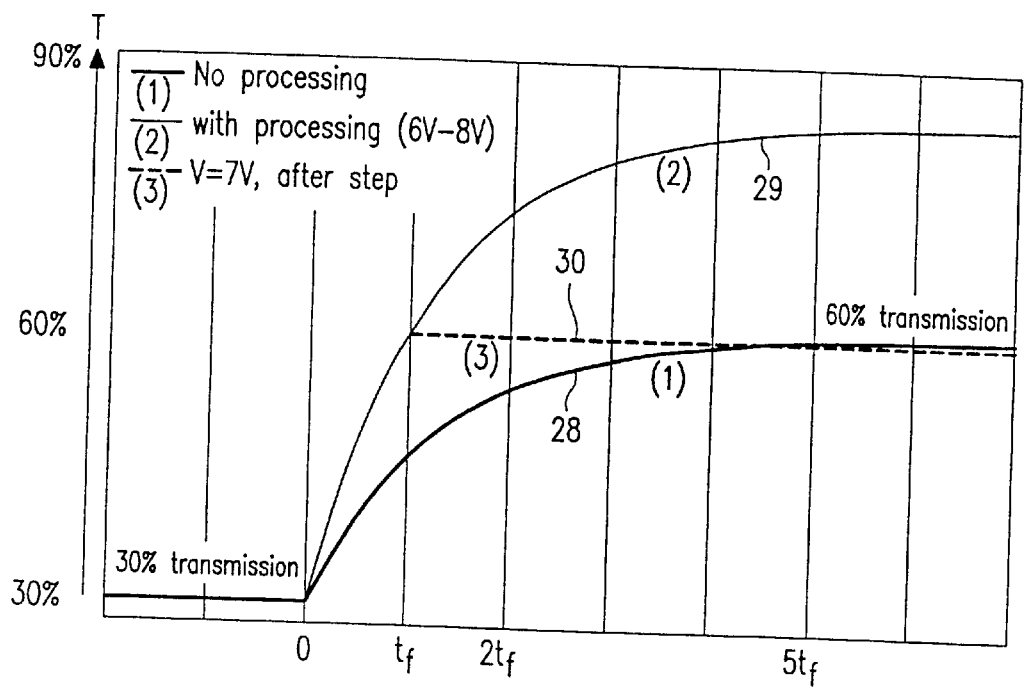
FIG. 5 shows an example of the switching behavior of a pixel, both for a device without correction means and for a device with the correction means according to the invention.
Figure 6:
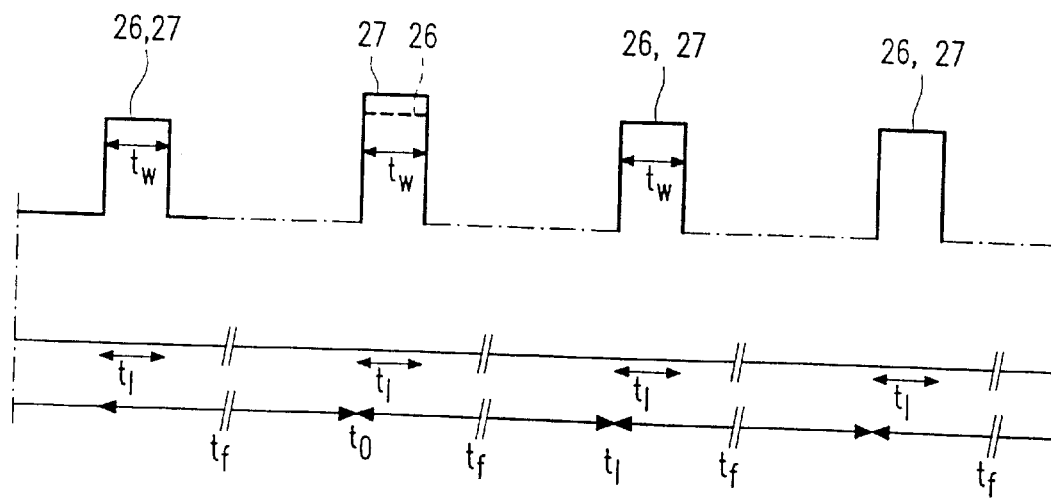
FIG. 6 shows diagrammatically associated pulse patterns.

In the example of FIGS. 5, 6, the information changes at the instant $t_0$ in such a way that the transmission level of a pixel should change from 30% to 60%. To this end, the voltage across a pixel is raised from 6 volts to 7 volts during the selection time subsequent to the instant $t_0$ (pattern 26 in FIG. 6); during the subsequent selection time, a voltage of 7 volts is supplied until the information changes again. This is associated with a pattern 28 (FIG. 5, curve 1) of the voltage across the pixel which is determined to a great degree by the inertia of the liquid crystal material. Since the capacitance of the pixel hardly changes, a correction, as known from U.S. Pat. No. 5,495,265, has little effect.

However, it has been surprisingly found that switching can be accelerated by once supplying the voltage at a much higher value (or at a lower value when switching to a lower transmission level) (pattern 27 in FIG. 6). The corrections thus found are many times larger than those which are customary for the TN effect, as described in U.S. Pat. No. 5,495,265. Consequently, the voltage across the pixel acquires a pattern 29 (FIG. 5, curve 20 if the voltage across the pixel is raised from 6 volts to 8 volts during the selection time subsequent to the instant $t_0$ (pattern 27 in FIG. 6). As is apparent from FIG. 5, the desired transmission level is reached within one field time $t_f$, so that the correction is no longer necessary from $t_1$. From $t_1$, a voltage of 7 volts is therefore applied again across the pixel (pattern 26) during the subsequent selection times. The voltage across the pixel now acquires a pattern 30 (FIG. 5, curve 3). Although the voltages across the pixel in FIG. 6 have one polarity, changing polarities are used in practice. For the example shown here, ZLI 4792 from the firm of Merck was used as a liquid crystal material. The Table below shows which voltages must be supplied once across a pixel (during the next selection) at a desired voltage across the pixel. The left-hand column states the voltage across the pixel before a change of information, whereas the first row indicates the desired voltage across the pixel after a change of information.

TABLE I

|  | 3 V | 4 V | 5 V | 6 V | 7 V | 8 V |
|---|---|---|---|---|---|---|
| 3 V |  | 6.6 V | 9.3 V | 11.8 V | 13.7 V | 15.4 V |
| 4 V | 2.2 V |  | 6.8 V | 9.1 V | 11.2 V | 12.9 V |
| 5 V | 2.0 V | 3.2 V |  | 7.3 V | 9.3 V | 11.1 V |
| 6 V | 1.65 V | 2.6 V | 4.0 V |  | 8.0 V | 9.8 V |
| 7 V | 1.6 V | 2.6 V | 3.5 V | 4.9 V |  | 8.8 V |
| 8 V | 1.6 V | 2.4 V | 3.1 V | 4.4 V | 6.2 V |  |

Figure 7:
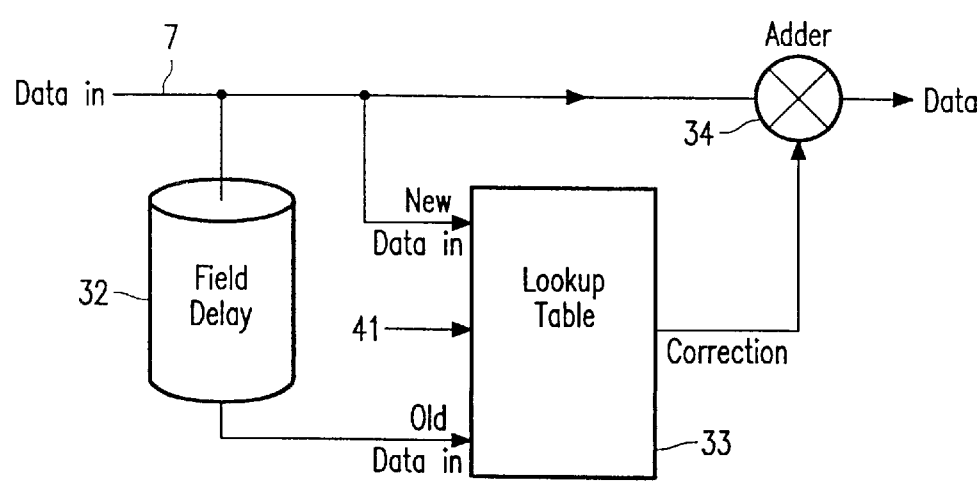

The correction is performed, for example by means of the circuit shown in FIG. 7. The information 7 ($Data_{in}$) of a picture line supplied during a first field is applied to a delay circuit 32 having a delay time of one field time, a LUT (look-up table) 33 and an adder 34. After one field time, the information 7 changes. The changed information (New Data$_{in}$) is supplied from that instant to the delay circuit 32, the LUT 33 and the adder 34. The delayed information from the previous field (Old Data$_{in}$) and the changed information (New Data$_{in}$) jointly address the LUT 33 which determines the correction, for example, as described with reference to Table I. In the adder 34, this correction is added to the changed information (New Data$_{in}$). The data thus determined is supplied to the column electrodes 4, either or not via the shift register 9. Instead of being determined in the drive unit 8, the correction may be alternatively determined with reference to voltages supplied by the shift register 9.

If necessary, each pixel is provided with an auxiliary capacitor 13. The presence of auxiliary capacitors 13 reduces the loss of voltage across the pixels. The auxiliary capacitors have a capacitance which is, for example approximately 6 times that of a pixel. The relative change of capacitance of the pixel is even further reduced so that the use of a correction as described in U.S. Pat. No. 5,495,265 has hardly any effect.

Figure 8:
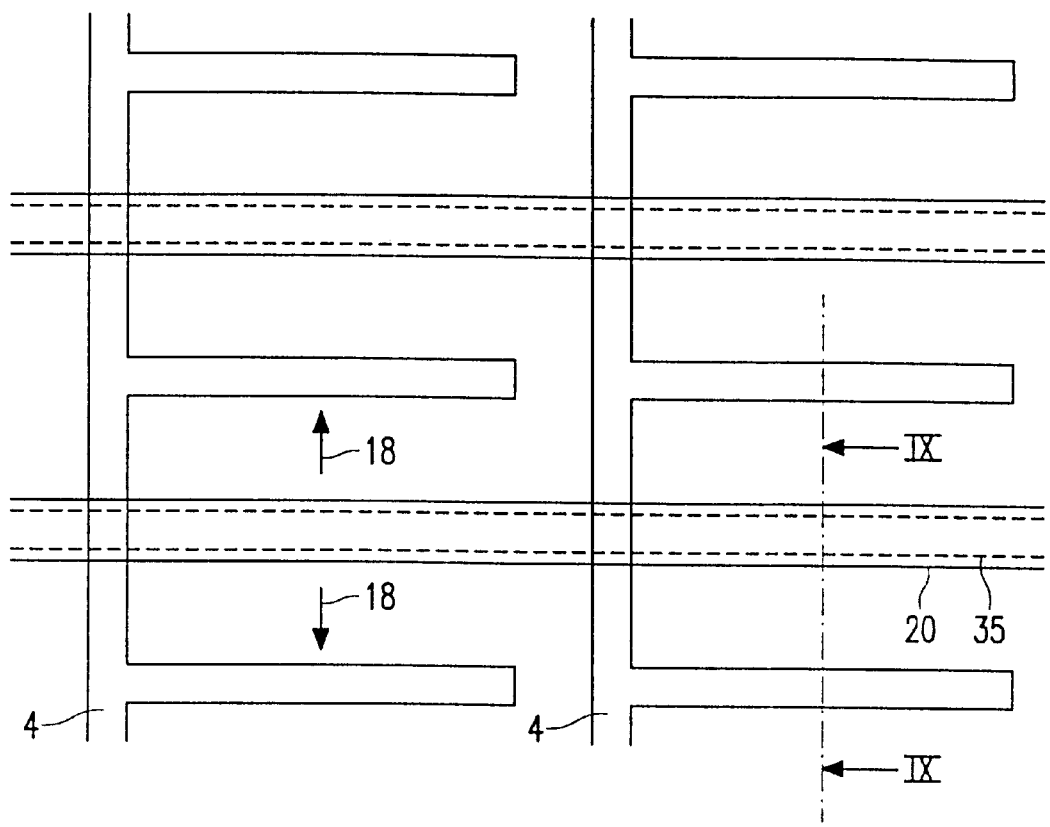
FIG. 8 is a plan view of a further pixel operating on the basis of IPS.
Figure 9:
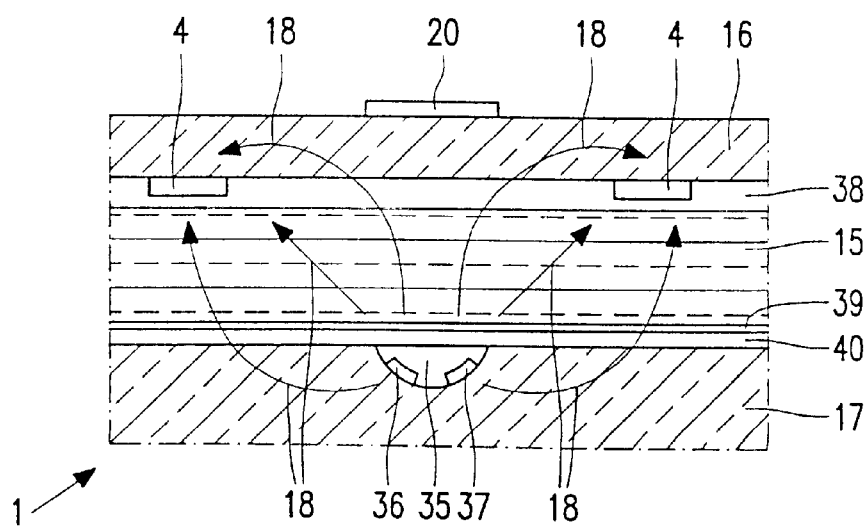
FIG. 9 is a cross-section taken on the line IX—IX in FIG. 8.

In FIGS. 8 and 9, which show a part of a display device of the Plasma Addressed LCD (PALC), consecutive rows of pixels are selected with plasma ducts 35 realized in the substrate 17 and provided with cathode 36 and anodes 37. A plasma discharge is generated by means of the cathode and anode in the duct which is filled with an appropriate gas mixture. The duct thereby becomes conducting and fulfils a selecting function for a row of pixels. The duct is separated from the liquid crystal layer by a thin dielectric layer 40. For a description of the full operation of these types of devices, reference is made to Buzak et al, "A 16-Inch Full Color Plasma Addressed Liquid Crystal Display", Digest of Techn. Papers, 1993 SID Int. Symp., Soc. for Info. Displ. pp. 883–886. A number of elements, such as polarizers, are omitted in FIGS. 8, 9 for the sake of simplicity.

Since the row electrodes provided, in this example on the other substrate 16, have, for example a comb-shaped structure with teeth parallel to the plasma duct, and since the liquid crystal layer 15 has a much smaller thickness than the distance between the plasma duct and the teeth, the molecules rotate, due to the applied electric field (denoted by arrows 18) again in a plane which is substantially parallel to the two substrates. The reference numerals further have the same significance as in the previous examples. The transmission/voltage characteristic has a similar variation as that shown in FIG. 4, be it that higher voltages across the pixels are required. Dependent on incoming information, a correction table similarly as for the device of FIGS. 1, 2, 3 can be derived for these data voltages. The correction can then be realized again with a circuit as shown in FIG. 7.

The device may not only be transmissive but also reflective by manufacturing, for example the substrate 17 of an opaque material and providing it with a reflector. Alternatively, an LC material having a negative dielectric anisotropy can be chosen. Moreover, variations of the circuit of FIG. 7 are possible. For example, the correction may be alternatively computed by means of a microprocessor. In this case, and also in the case of a LUT, the (digitized) value of the ambient or liquid temperature may serve as extra input data 41 so as to correct also for temperature fluctuations.

In summary, the invention relates to an LC display device based on "in plane switching", in which the switching speed is increased by overdriving the pixels upon a change of the voltage across these pixels while taking, for example the hydrodynamical properties of the LC material into account. The correction means may also be used to correct for changes of ambient or liquid temperature.

What is claimed is:

1. A display device comprising:

two substrates, at least one of which is transparent, liquid crystal material between the substrates, orientation means orienting the molecules of the liquid crystal material substantially parallel to the substrates, electrodes on at least one of the substrates, polarization means, selection means for selecting at least one pixel, an electric field being applied substantially parallel to said substrates in the operating state during selection, and drive means for supplying a signal voltage to an electrode coupled to the pixel, characterized in that the drive means is provided with correction means which, during selection of a pixel, adapt the signal voltage to be supplied to the electrode coupled to the pixel, dependent on an external data voltage supplied during the selection and on the external data voltage supplied during the previous selection of the same pixel.

2. A display device as claimed in claim 1, characterized in that the correction means adapt the signal voltage in such a way that the pixel reaches its transmission or reflection value associated with the external data voltage before the next selection of the same pixel.

3. A display device as claimed in claim 2, characterized in that the duration of the selection and the hydrodynamical properties of the liquid crystal material determine the adaptation of the signal voltage by the correction means.

4. A display device as claimed in claim 2, characterized in that the display device is provided with a temperature sensor, and the correction means adapts the correction to temperature changes.

5. A display device as claimed in claim 1, characterized in that the duration of the selection and the hydrodynamical properties of the liquid crystal material determine the adaptation of the signal voltage by the correction means.

6. A display device as claimed in claim 1, characterized in that the display device is provided with a temperature sensor, and the correction means adapt the correction to temperature changes.

7. A display device as claimed in claim 1, characterized in that the correction means comprise a microprocessor or a look-up table.

8. An active matrix display device having a matrix of pixels, comprising:

two substrates, at least one of which is transparent, liquid crystal material between the substrates, orientation means orienting the molecules of the liquid crystal material substantially parallel to the substrates, electrodes on at least one of the substrates, polarization means, selection means for selecting at least one pixel, an electric field being applied substantially parallel to said substrates in the operating state during selection, and drive means for supplying a signal voltage to an electrode coupled to the pixel, characterized in that the drive means is provided with correction means which, during selection of a pixel, adapt the signal voltage to be supplied to the electrode coupled to the pixel, dependent on an external data voltage supplied during the selection and on the external data voltage supplied during the previous selection of the same pixel, each pixel electrode is coupled via a thin-film transistor to a data electrode for the corrected data voltage, and the selection means comprises row electrodes for selecting the respective thin-film transistor.

9. A display device as claimed in claim 8, characterized in that the duration of the selection and the hydrodynamical properties of the liquid crystal material determine the adaptation of the signal voltage by the correction means.

10. A display device as claimed in claim 8, characterized in that the display device is provided with a temperature sensor, and the correction means adapts the correction to temperature changes.

11. A display device as claimed in claim 8, characterized in that the correction means comprises a microprocessor or a look-up table.

12. A display device as claimed in claim 8, characterized in that the correction means adapts the signal voltage in such a way that the pixel reaches its transmission or reflection value associated with the external data voltage before the next selection of the same pixel.

13. A display device as claimed in claim 12, characterized in that the duration of the selection and the hydrodynamical properties of the liquid crystal material determine the adaptation of the signal voltage by the correction means.

14. A display device as claimed in claim 12, characterized in that the display device is provided with a temperature sensor, and the correction means adapts the correction to temperature changes.

15. A PALC display device having a matrix of pixels comprising:

two substrates, at least one of which is transparent, liquid crystal material between the substrates, orientation means orienting the molecules of the liquid crystal material substantially parallel to the substrates, electrodes on one of the substrates, polarization means, selection means comprising plasma ducts in the other substrate, for selecting at least one pixel, an electric field being applied substantially parallel to said substrates in the operating state during selection, and drive means for supplying a signal voltage to an electrode coupled to the pixel, characterized in that the drive means is provided with correction means including data electrodes on said one of the substrates, each data electrode is coupled to the electrode of at least one of said pixels, and during selection of a pixel, the correction means adapts the signal voltage to be supplied to the electrode coupled to the pixel, dependent on an external data voltage supplied during the selection and on the external data voltage supplied during the previous selection of the same pixel.

16. A display device as claimed in claim 15, characterized in that the duration of the selection and the hydrodynamical properties of the liquid crystal material determine the adaptation of the signal voltage by the correction means.

17. A display device as claimed in claim 15, characterized in that the display device is provided with a temperature sensor, and the correction means adapts the correction to temperature changes.

18. A display device as claimed in claim 15, characterized in that the correction means comprises a microprocessor or a look-up table.

19. A display device as claimed in claim 15, characterized in that the correction means adapts the signal voltage in such a way that the pixel reaches its transmission or reflection value associated with the external data voltage before the next selection of the same pixel.

20. A display device as claimed in claim 19, characterized in that the duration of the selection and the hydrodynamical properties of the liquid crystal material determine the adaptation of the signal voltage by the correction means.

* * * * *